ns
United States

Wong et al.

3,772,870

[45] Nov. 20, 1973

[54] SIZING COMPOSITION AND GLASS FIBERS SIZED THEREWITH

[75] Inventors: Robert Wong; Martin C. Flautt, both of Granville; Richard M. Haines, Warsaw, all of Ohio

[73] Assignee: Owens-Corning Fiberglass Corporation, Toledo, Ohio

[22] Filed: June 7, 1971

[21] Appl. No.: 150,723

[52] U.S. Cl.......... 57/140 G, 57/149, 117/126 GB, 117/126 GE, 260/2 EN, 350/96 B
[51] Int. Cl............................ D02g 3/18, D02g 3/36
[58] Field of Search............... 117/126 GB, 126 GE; 65/4, DIG. 7; 161/143; 156/169, 172; 350/96; 174/112; 260/2 EN; 57/149, 140 G, 153

[56] References Cited
UNITED STATES PATENTS

| | | |
|---|---|---|
| 3,301,648 | 1/1967 | Sheldon .................................. 65/4 |
| 2,931,739 | 4/1960 | Marzocchi et al............ 117/126 GB |
| 1,727,972 | 9/1929 | Ford .................................. 174/112 |
| 2,762,718 | 9/1956 | Kleiner et al..................... 260/2 EN |
| 3,597,265 | 8/1971 | Mecklenborg et al. .......... 260/2 EN |
| 3,249,412 | 5/1966 | Kolek et al.................. 117/126 GB |
| 3,454,515 | 7/1969 | Hathwar...................... 117/126 GB |
| 3,631,667 | 1/1972 | Marzocchi ........................ 57/149 X |
| 3,410,077 | 11/1968 | Marzocchi et al................ 57/140 G |
| 3,644,866 | 2/1972 | Deardruff ......................... 57/140 G |
| 2,573,361 | 10/1951 | Rodgers et al..................... 57/140 G |

*Primary Examiner*—William D. Martin
*Assistant Examiner*—William H. Schmidt
*Attorney*—Staelin & Overman

[57] ABSTRACT

A sizing composition for glass fibers is provided, comprising polyvinyl acetate, water dispersible epoxy resin and numerous lubricants, herein the sized glass fibers are used in fiber optics for the transmission of light or images from one point to another, which sizing enables further processing of the glass fibers without substantial loss in transmission.

1 Claim, No Drawings

SIZING COMPOSITION AND GLASS FIBERS SIZED THEREWITH

BACKGROUND OF THE INVENTION

This invention relates to a sizing composition for use on fibrous materials, particularly glass fibers, which sized fibrous materials find particular utility in the field of fiber optics.

In the fiber optics field, a number of individual fibers or filaments are bundled together to form what the art refers to as a light pipe or fiber optic array. The optical fibers used to produce light pipes are flexible and therefore capable of being curved around obstacles or being placed in remote areas where conventional lighting sources are unsafe or of limited practical value. Optical fibers have myriad uses including for example, monitoring and lighting devices in automobiles, aircraft, appliances, computers, and medical applications. Light pipes are particularly useful in applications where non-current carrying and therefore nonshorting or non-sparking light transmitting means are necessary or desirable due to safety considerations. One specific use contemplates light pipes running from automobile headlights and taillights to the dashboard or rear window shelf. As long as the monitored headlight or taillight is operating properly, the light pipe transmits light therefrom and indicates to the driver that the lights are functioning. If one of the lights fails, the absence of light being transmitted by the light pipe informs the driver of a malfunction. Light pipes are also useful in lighting the various dashboard panel instruments. By running light pipes from a single, easily accessible light source to the various panel instruments, the need for a large number of small, remotely located light sources is eliminated.

Light pipes may be composed of glass or plastic materials. In either case, the individual fibers or filaments are composed of two essential components, namely a central core having an index of refraction higher than an outer cladding or sheath which surrounds the core. Due to the different indices of refraction of the core and cladding materials, the principle of total internal reflection operates to reflect light entering one end of the fibers along the internal length of the fiber to its opposite end.

The concept of transmitting light from one location to another by means of total internal reflection with an optically transparent fiber or array of fibers is well known in the art. Plastic and glass materials have been found to be the most desirable materials for producing optical fibers. Glass fibers, however, due to their high heat resistance and retention of other desirable properties over long periods of time under adverse conditions are preferred. For example, where plastic fibers begin to become brittle and discolor when exposed to temperature above about 175°F. or experience a reduction in light transmission when exposed to long periods of heat and high humidity, glass light pipes continue to function at temperatures approaching 1,000°F. and are unaffected by humid conditions.

Although optical glass fibers are preferred, the art has been unable to produce continuous core and cladding glass composite fibers in the quantities and at the cost required by most commercial applications. This problem centers around the fact that conventional methods of producing glass fibers have been difficult to use in producing two component optical fibers. In addition to the usual problems experienced in producing fine or small fibers, the methods of producing glass light pipes require that the core and cladding glasses have different compositions and different indices of refraction while also having similar liquidus temperatures, viscosities, and coefficients of thermal expansion so that the core and cladding are compatible when formed into a composite fiber.

Reference is made to application Ser. No. 827,056, filed May 22, 1969, now U.S. Pat. No. 3607322, which discloses preferred core and cladding glass compositions for use in fiber optics.

Although these light conducting filaments or cylinders, often known as "light pipes", have been a reality for some time, there persist problems in manufacturing high quality light conducting filaments. The problems are especially difficult in manufacturing light conducting filaments of glass.

The usual light conducting filament includes a central region or core of glass or other light conducting material possessing a relatively high index of refraction; the filament further includes an outer sheath or coating of glass or other material having a relatively low index of refraction. The low refractive index material that surrounds the core gives the optical insulation necessary for light reflection at the interface between the core and sheath of the filament to propagate light along or within the core.

Conventional practice combines separate and different refractive index materials to produce a light conducting filament having a core and coating or sheath. In combining the core and sheath there are a number of problems that can affect light propagation along the core.

The interface between the core and sheath must be free from dirt and particles of any sort. If the interface is not clean, light transmission is disrupted. The result is drastically reduced light transmission through the core.

The core must be exceedingly clear. Any light dispersing interference such as crystalline structures or coloring oxides in glass reduces the light transmission by the core.

The "rod and tube" method of producing light conducting glass filaments tend to make filaments that are dirty at the interface, between the core and sheath. Particles and other foreign matter at the interface disrupt light transmission along the core.

Other methods for producing light conducting glass filaments use glass cullet as the glass source. The use of glass cullet introduces impurities in the glass of the core that reduce light transmission. Moreover, in processes using glass cullet to make light conducting filaments the glass of the filaments has been numerous times passed through a range of temperature in which devitrification occurs. The repeated times through such temperature range promotes crystalline structures in core glass that will interfere with light transmission.

There is a need to produce light conducting filaments having a clean interface and having a core glass free from impurities and other light interference; until the need is met the uses for light conducting filaments cannot be fully expanded.

The preferred method for producing light conducting glass filaments comprising a core-sheath composite, is specifically described in application Ser. No. 101,579, filed Dec. 29, 1970, now abandoned. It is these composite fibers that are sized with the inventive composition, thereby allowing subsequent processing operations, such as cutting the glass fibers to length, overwrapping the glass fibers in a protective sheath, banding the ends of the glass fibers, etc., to be performed without substantially changing the degree of light transmission through the glass fibers.

There arose a need for applying or injecting a resinous material into the sized fibrous bundle. This need evolved from a problem of loss of light transmission when the sized fibrous bundle was cut to desired lengths. Various cutting techniques and various types of cutting apparatus were used to try to reduce the loss in light transmission, which arose from disturbing the orientation of the plurality of fibers in the fiber bundle.

The sized glass fibers are normally end-capped with a band or a ferrule prior to cutting, but the light transmission is severely reduced because of fraying of the fibers and disruption of the integrity of the fibrous bundle, thereby allowing the light to scatter during transmission. Subsequently, after the bundle of fibers is end-capped with a band, a resinous material such as epoxy, polyester or other resin which is capable of hardening, is then injected into the end-capped portion of the fibrous bundle. After the resin hardens, the end of the fibrous bundle is polished.

The injection of the fiber bundle with the resinous material was not without its own problems; although the light transmission improved, the improvement was not that substantial because the integrity of the sized fibrous bundle was disturbed. The loss of integrity of the fibrous bundle was due to the sized glass fibers' inability to allow the resinous material to wet-out the glass fibers, especially under the band surrounding the fibers.

However, when the inventive sizing was employed the orientation of the fibers was maintained in a substantially parallel position. The sizing also provided the necessary flexibility to the fibrous bundle so that the bundle could be wrapped around a ¼ inch mandrel a number of times without breaking any of the filaments. Furthermore, after the sized bundle was end-capped, the sizing provided excellent wet-out properties to the bundle of glass fibers, so that when the bundle was injected with the resinous material, it dispersed uniformly throughout that portion of the bundle which was injected. Upon curing, the hardened resinous material was polished without disrupting the orientation of the fibers, thereby substantially reducing the loss of light transmission through the treated fibers.

The diameter of the sized fibrous glass bundles that are preferably used as light pipes is approximately 0.002 inches; the bundles are thereby quite brittle, especially when flexed or twisted. The finished product preferably comprises a bundle of from one to 50 strands, wherein each strand consists of from 50 to 200 glass filaments. Each filament must be protected by the inventive sizing during the formation of the filament. The sized strands must also withstand post-forming operations, such as roving, plying and overwrapping wherein the fibers are protected with a thermoplastic material.

The strands are plied by rotating a plurality of forming packages and removing the strands from the outside edge of the forming package. If the strands are not lubricated properly, split strands result from one strand picking up filaments from an adjoining strand, causing fuzz and/or eventual break-outs.

The inventive composition provides a non-tacky surface on the glass filaments which can be further processed without deleteriously affecting the glass filaments. In addition, the sized glass strands are capable of orienting themselves into a round bundle during the plying operation. This is an unexpected result because there is a tendency for the glass strand to become flat, especially when they are wound on a collection spool. The sized glass strands of our invention also return to their original round configuration during the overwrapping or jacketing operation.

SUMMARY OF THE INVENTION

This invention relates to a sizing composition for use on fibrous materials, particularly glass fibers, which glass fibers find utility in the field of fiber optics.

Glass fibers after formation, must withstand subsequent processing operations, especially when the intended end use is for fiber optics. This requires the glass fibers to possess good handleability characteristics during the subsequent processing. That is, the sized glass fibers must be capable of running out from its forming package without disturbing the other filaments on the forming package. Also, when a plurality of bundles of sized glass fibers are combined into a single strand from a plurality of forming packages, such as in the roving operation to obtain a larger diameter strand, the glass fibers must withstand potential destruction from frictional devices and from mutual abrasion. Furthermore, the sizing composition must be capable of improving the characteristics of the final manufactured product, especially in the last step of its manufacture, during end-capping or banding and polishing of the ends of the glass fiber bundles.

It has been found that the use of a composite lubrication system in combination with film formers, gel agents, coupling agents, additional lubricants, surfactants, emulsifiers, and other materials that generally constitute a sizing composition for glass fibers, improves the handleability or processing characteristics of the glass fibers. In some applications, the composite lubrication system can be used alone, as a coating for glass fibers. This composite lubrication system consits of a blend of polyoxyethylene sorbitan tristearate, polyoxyethylene sorbitan trioleate, and polyvinyl pyrrolidone. The composite lubrication system provides good wet-out properties to the sized glass fibers and also provides integrity to the bundle of sized glass fibers. Wet-out properties are especially important when the sized glass fibers are to be further treated, such as with an elastomeric material. The integrity imparted to the bundle of glass fibers is essential during the handling of the bundle of glass fibers in subsequent processing operations.

Polyvinyl pyrrolidone, by itself, is generally characterized as a film former. However, when it is combined with polyoxyethylene sorbitan tristearate and polyoxyethylene sorbitan trioleate a synergistic effect results. Generally, it is preferred to have the three constituents present in equal percentages by weight, ranging from 0.1 to 5.0 percent by weight, based on the total weight of the sizing composition. However, the amounts may be varied according to the effect desired for the sized glass bundle. For example if increased strand integrity is desired, then the amount of polyvinyl pyrrolidone is increased accordingly.

Examples of film formers that have been used in combination with the composite lubrication system include epoxies, polyvinyl acetates, polyesters, polyacrylamides, elastomers, polyethylene imines, and starches.

Examples of gel agents that have been used in combination with the composite lubrication system include carboxy methyl cellulose, ethyl cellulose, polyacrylamides and polycarboxylated vinyl polymers.

Examples of coupling agents that have been used with the composite lubrication system include organofunctional silanes such as polyaminofunctional silane (Z-6050), aminofunctional silanes (Z-6020 and Z-6026), methacrylate functional cationic silane, (Z-6031), mercaptofunctional silane (Z-6062), vinylfunctional silane (Z-6075), and chloroalkylfunctional silane (Z-6076), all commercially available from Dow Corning Corporation. Additional silanes include gamma-aminopropyltrimethoxy silanes (A-1100 and SC-3900), commercially available from Union Carbide Corporation and General Electric Corporation respectively. Other silanes include vinyltrichloro silane (A-150), vinyltriethoxy silane (A-151), vinyl-tri (beta-methoxyethoxy) silane (A-172), gamma-methacryloxypropyltrimethoxy silane (A-174), gamma-glycidoxypropyltrimethoxy silane (A-187), N-bis (beta-hydroxyethyl) gamma-aminopropyltriethoxy silane (A-111), and N-beta (aminoethyl) gamma-aminopropyltrimethoxy silane (A-1120), all commercially available from Union Carbide Corporation.

Examples of additional lubricants, surfactants, and emulsifiers that have been used with the composite lubrication system include an anionic fatty acid long chain derivative commercially available under the trade designation TWITCHELL 7440 from Emery Industries, Inc., dioctyl phthalate, DC 231 from Dow Corning Corporation, octylphenoxypolyethoxyethanol commercially available under the trade designation TRITON X-100 from Rohm & Haas Company, CF-1088 from General Electric Corporation, and X-1104 from Quaker Chemical Company.

When glass fibers are sized with the composite lubrication system alone, without film formers, gel agents, coupling agents and other materials that generally constitute a sizing composition for glass fibers, and the sized glass fibers are dried, a coating remains on the glass fibers ranging from about 0.1 to about 1.5 percent by weight, based upon the weight of the coated glass fibers. Preferably, the coating that remains on the glass fibers ranges from about 0.2 to about 0.6 percent by weight, based upon the weight of the coated glass fibers.

The use of the composite lubrication system is further demonstrated in the examples that follow.

It is therefore an object of the present invention to provide a sizing composition for fibrous materials, particularly glass fibers, which sizing provides the glass fibers with improved abrasion resistance during subsequent operations.

It is another object to provide a sizing composition for glass fibers, which sizing provides sufficient strand integrity to the bundle of glass fibers while at the same time imparting excellent flexing characteristics to the bundle.

It is still another object to provide a sizing composition for glass fibers which is compatible or non-reactive with thermoplastic overwrap or jacket, particularly polyvinyl chloride.

It is yet another object to provide sized glass fibers which, subsequent to being securely held together, such as by banding, demonstrate uniform wet-out or wicking characteristics with resinous materials, such as epoxy resins.

DESCRIPTION OF THE PREFERRED EMBODIMENTS

Example I

| Ingredients | Percent by Weight |
| --- | --- |
| Polyvinyl acetate | 1.0 |
| Polyoxyethylene sorbitan tristearate | 0.5 |
| Polyoxyethylene sorbitan trioleate | 0.5 |
| Polyvinyl pyrrolidone | 0.5 |
| Water dispersible epoxy resin | 1.5 |
| Acetic acid | 0.15 |
| Methyl cellulose | 0.75 |
| Deionized water | balance |

Example II

| Ingredients | Percent by Weight |
| --- | --- |
| Polyvinyl acetate | 1.0 |
| Polyoxyethylene sorbitan tristearate | 0.5 |
| Polyoxyethylene sorbitan trioleate | 0.5 |
| Polyvinyl pyrrolidone | 0.5 |
| Water dispersible epoxy resin | 1.5 |
| Acetic acid | 0.15 |
| Deionized water | balance |

Example III

| Ingredients | Percent by Weight |
| --- | --- |
| Polyvinyl acetate | 0.0–20.0 |
| Polyoxyethylene sorbitan tristearate | 0.1–5.0 |
| Polyoxyethylene sorbitan trioleate | 0.1–5.0 |
| Polyvinyl pyrrolidone | 0.1–5.0 |
| Water dispersible epoxy resin | 0.0–20.0 |
| Acetic acid | to a pH of 3.0–7.0 |
| Deionized water | balance |

Example IV

| Ingredients | Percent by Weight |
| --- | --- |
| Polyvinyl acetate | 0.5–2.0 |
| Polyoxyethylene sorbitan tristearate | 0.25–1.0 |
| Polyoxyethylene sorbitan trioleate | 0.25–1.0 |
| Polyvinyl pyrrolidone | 0.25–1.0 |
| Water dispersible epoxy resin | 0.5–3.0 |
| Acetic acid | to a pH of 3.0–7.0 |
| Deionized water | balance |

Example V

| Ingredients | Percent by Weight |
| --- | --- |
| Polyvinyl acetate | 4.5 |
| Long chain fatty derivatives | 0.5 |
| Polyethylene glycol monostearate | 0.5 |
| Dioctyl phthalate | 0.5 |
| Water dispersible epoxy resin | 1.5 |
| Acetic acid | to a pH of 3.0–7.0 |
| Deionized water | balance |

The mixing procedure preferably consists of combining separate premixes and then combining the premixes in a main mixing vessel. Premix I comprises combining the water dispersible epoxy resin, acetic acid, polyoxyethylene sorbitan tristearate, and polyoxyethylene sorbitan trioleate. This mix is heated from approximately 75° to 120°F. with agitation until the polyoxyethylene sorbitan tristearate melts and the mixture becomes homogeneous. Approximately 20 percent by volume of the required water content is slowly added to the homogeneous mix so that the mix thickens and then inverts to a liquid. The acetic acid helps disperse the epoxy resin in this aqueous system. Premix II comprises combining the polyvinyl pyrrolidone and approximately 1 percent by volume of the required water content with agitation. Premix III comprises combining the balance of the required water content into a main mixing vessel, and under agitation the polyvinyl acetate is slowly added to attempt a uniform dispersion. To this premix in the main mixing vessel Premix I is added slowly with agitation followed by the addition of Premix II with agitation. The combined contents of the premixes are then agitated for about five to ten minutes to insure homogenization. The pH is then adjusted to a range of from 3.0 to 7.0 and preferably to about 3.7 ± 0.2.

The polyvinyl acetate is commercially available under the trade designation 25-2813 from Quaker Chemical Company. The polyoxyethylene tristearate and polyoxyethylene trioleate are commercially available under the trade designation TWEEN 65 and TWEEN 85 respectively from Emulsion Engineering Inc. The polyvinyl pyrrolidone is commercially available under the trade designation PVP-K-90 from General Aniline Corporation. The water dispersible epoxy resin is commercially available under the trade designation MME-3A from Owens-Corning Fiberglas Corporation. The methyl cellulose is commercially available under the trade designation METHOCEL HG 90 DGS from Dow Chemical Company Other film formers that may be substituted for all or part of the polyvinyl acetate and/or epoxy resin include acrylics, polyvinyl alcohols, polyesters, starches, polyethylene imines, nylons, teflons, and phenolics.

Other lubricants that may be substituted for all or part of the polyoxyethylene sorbitan tristearate and the polyoxyethylene sorbitan trioleate include dioctyl phthalate, silicone oils, polyethylene glycol, glycerin, and long chain fatty acid derivatives.

The sizing materials produced as described in Examples I through V were applied to glass fibers in the forming operation wherein the sized fibers were gathered into a bundle or strand and collected on a forming package. Subsequently a number of these forming packages were placed on a creel so that the fibrous bundle from each forming package could be pulled and combined into a larger bundle in a roving operation. The roving may either be collected on a roving package or, in a more continuous operation, the roving bundle, after formation, is passed through a thermoplastic material such as polyvinyl chloride wherein the excess is removed by a wiping die. The thermoplastic material functions as a protective overwrap for the glass fibers. Subsequently the thermoplastic overwrap or jacket on the roving bundles is exposed to heat. The overwrapped bundle is cut to desired lengths and the ends of the overwrapped fibrous bundle are capped or banded such as by a brass ring or other suitable means which serves as a fitting for the fibrous bundle. The ends of the fibrous bundle after being banded are injected with a resin which is capable of hardening and capable of being polished. Preferably an epoxy resin is injected approximately one-sixteenth to three thirty-seconds of an inch into both ends of the bundle. The inventive sizing composition provides for a uniform wicking of the epoxy resin throughout the end of the sized fibrous bundle. After the epoxy resin is hardened, the end of the bundle is polished to improve the degree of light transmission.

The objectives of the epoxy resin that is injected into the ends of the bundles is at least two-fold: (1) to provide a polished end on the fibrous bundle and (2) to maintain the ends of the fibers in place when flexing of the bundle is performed. Without the hardened epoxy at the ends of the bundle the glass fibers in the bundle will displace during the flexing and thereby adversely affect the degree of light transmission.

The inventive sizing composition may be in the form of a shear-thinning reversible gel or the sizing may be in the form of a liquid. This is usually dependent upon how the drying of the sized fibrous bundle is accomplished. If a dielectric oven is employed between the size applicator and the winder for the forming package, to lower the moisture content on the glass strand to less than about 2.0 percent to prevent migration of the sizing on the forming package, the preferred procedure is to use a liquid sizing. If conventional gas or electric ovens are employed, it is preferred to use a gel sizing, thereby preventing migration of the sizing on the forming package.

The sizing composition of this invention must possess the above described properties otherwise the fibrous material, particularly glass fibers, when cut to a desired length, fray and lose their integrity; this destroys or substantially reduces the degree of light transmission from one end of the fibrous bundle to the other. This loss of light transmission becomes extremely important especially as the length of the light pipe is increased. In order to compensate for the loss in transmission of light during the cutting operation, the fibrous bundle is injected or impregnated with a resinous material, only at the very ends of the bundle, which resin is capable of hardening and being polished. It is especially to this polishing operation that the inventive sizing composition lends its capability. No known sizing materials possessed this capability and it wasn't until the inventive sizing composition was established that the polishing operation could be successfully performed. Not only that, but the inventive sizing composition allowed the polishing operation to be performed without a sacrifice in the other desirable characteristics mentioned above.

There are situations where it is desirable to add an inorganic pigment to the inventive sizing which is used on light pipes in order to identify the light pipes by the number of filaments.

Example VI

| Ingredients | Percent by Weight |
|---|---|
| Polyvinyl acetate | 1.0 |
| Polyoxyethylene sorbitan tristearate | 0.5 |
| Polyoxyethylene sorbitan trioleate | 0.5 |
| Polyvinyl pyrrolidone | 0.5 |
| Water dispersible epoxy resin | 1.5 |
| Acetic acid | 0.15 |
| Methyl cellulose | 0.75 |
| Inorganic pigment | 0.25 |
| Deionized water | balance |

The inorganic pigment is held in suspension by the gelled sizing. Some of the inorganic pigments that have been used in combination with the inventive sizing include ARIDYE Padding Yellow (4GL09-9859), Inmont Padding Pink (N3B09-9381), ARIDYE Padding Blue (2G209-9750), Inmont Padding Green (NB09-9480), ARIDYE Padding Orange (09-9898), and ARIDYE Padding Violet (09-9652). The pigment may be added to the sizing in concentrations ranging from 0.25 to 10.0 percent by weight.

Glass fibers, when treated with the sizing compositions of Examples I – VI, and subsequently dried, having a coating or strand solids ranging from about 0.25 to about 3.0 percent by weight, based upon the weight of the coated fibers. The preferred strand solids on the treated glass fibers ranges from about 0.4 to about 1.0 percent by weight, based upon the weight of the coated fibers.

It is thought that the combination of film formers, polyvinyl acetate and water-dispersible epoxy in combination with the lubrication constituents yields a strand or bundle of glass fibers which possess excellent handling characteristics during post-forming operations, strand integrity, non-reactibility with a thermoplastic overwrap or jacket and excellent wet-out characteristics or wicking effect when a resinous material is injected into the sized bundle of fibers during the banding or end-capping operation. The lubrication system employed in the inventive composition serves as a good wet-lubricant to protect the strand in the forming operation particularly when the sizing is applied by an applicator and when the sized filaments are gathered into a strand. The lubrication system is also a good dry-lubricant which protects the strands during post-forming operations such as plying, overwrapping with a thermoplastic jacket, banding, etc.

It is sometimes preferable to combine the sized fibrous bundle of glass fibers with another sized fibrous strand which is colored thereby imparting color identity to the product and also imparting stability to the fibrous bundle. A sizing which has performed satisfactorily in this capacity and which is inert or non-reactive with the sizing for the light pipes is as follows:

Example VII

| Ingredients | Percent by Weight |
|---|---|
| Polyethylene imine | 3.0 |
| Long chain fatty acid derivative | 1.0 |
| Methyl cellulose | 0.8 |
| Inorganic pigment | 6.0 |
| Deionized water | balance |

Example VIII

| Ingredients | Percent by Weight |
|---|---|
| Polyethylene imine | 1.0–10.0 |
| Long chain fatty acid derivative | 0.25–3.0 |
| Methyl cellulose | 0.25–1.5 |
| Inorganic pigment | 0.25–10.0 |
| Deionized water | balance |

The mixing procedure for Examples VII and VIII comprises weighing approximately three-fourths of the water requirements into a main mixing tank and subsequently adding thereto the polyethylene imine with agitation. Subsequently the long chain fatty acid derivative is diluted with sufficient water to aid in the dispersibility thereof when adding the same to the main mixing tank. Thereafter the methyl cellulose is added to the main mixing tank with agitation for approximately one-half hour or until the mix becomes very viscous. The inorganic pigment is diluted with the remaining water requirement and then added to the main mixing tank with agitation. The total contents of the main mixing tank after the last addition should be further agitated for approximately 2 additional hours.

The polyethylene imine is commercially available under the trade designation PEI–18 from the Dow Chemical Company. The long chain fatty acid derivative is commercially available under the trade designation TWITCHELL 7440 from Emery Industries. The methyl cellulose is commercially available under the trade designation METHOCEL HG 90 DGC from the Dow Chemical Company and the inorganic pigments are commercially available from Interchem Industries.

The sizing compositions from Examples VII and VIII were applied in the forming operation to G75's slivers of E-Glass composition and subsequently gathered into a strand and collected on a forming package. To the sized fibrous bundle of Examples I through V, the sized slivers or strands from Examples VII and VIII were spirally wrapped thereover at approximately one wrap per inch to help the fibrous bundle maintain their unity, i.e. prevent the ends from straying and help identify by color the number of ends in the fibrous bundle.

Glass fibers, when treated with the sizing compositions of Examples VII and VIII, and when subsequently dried, have a coating or strand solids ranging from about 0.5 to about 2.5 percent by weight, based upon the weight of the coated fibers. The preferred strand solids on the treated glass fibers ranges from about 0.7 to about 1.2 percent by weight, based upon the weight of the coated fibers.

We claim:

1. Light transmitting glass fibers in the form of an integral bundle, wherein the glass fibers have a dried coating of a sizing composition thereon and wherein the ends of the bundle of the coated light transmitting glass fibers possess a capability of being wet-out with a subsequently applied resinous material that is capable of being hardened and polished without disturbing the orientation of the coated light transmitting glass fibers in the bundle, said coating being present on the light transmitting glass fibers at from about 0.25 to about 3.0 percent by weight solids, based upon the weight of the coated light transmitting glass fibers, and said sizing composition comprising in percent by weight, based upon the total weight of the sizing composition, when applied:

| Ingredients | Percent by Weight |
|---|---|
| Polyvinyl acetate | 0.0–20.0 |
| Polyoxyethylene sorbitan tristearate | 0.1–5.0 |
| Polyoxyethylene sorbitan trioleate | 0.1–5.0 |
| Polyvinyl pyrrolidone | 0.1–5.0 |
| Water dispersible epoxy resin | 0.0–20.0 |
| Acetic acid | to a pH of 3.0–7.0 |
| Deionized water | balance | and wherein the bundle of coated light transmitting glass fibers is spirally wrapped with a strand of glass fibers having a dried film of a colored composition thereon, wherein the colored strand is non-reactive with the bundle of coated light transmitting glass fibers, said colored film being present on the glass fibers at from about 0.5 to about 2.5 percent by weight solids, based upon the weight of the colored film and the glass fibers, and said colored composition comprising, in percent by weight, based upon the total weight of the sizing composition, when applied:

| Ingredients | Percent by Weight |
|---|---|
| Polyethylene imine | 1.0–10.0 |
| Anionic long chain fatty acid derivative | 0.25–3.0 |
| Methyl cellulose | 0.25–1.5 |
| Inorganic pigment | 0.25–10.0 |
| Deionized water | balance |

* * * * *